US012726892B2

(12) United States Patent
Nikou et al.

(10) Patent No.: US 12,726,892 B2
(45) Date of Patent: Sep. 1, 2026

(54) MANAGING CONNECTIVITY OF A DEVICE TO A NETWORK

(71) Applicant: Telefonaktiebolaget LM Ericsson (publ), Stockholm (SE)

(72) Inventors: Alexandros Nikou, Stockholm (SE); Assad Alam, Älvsjö (SE); Pedro Batista, Sollentuna (SE); Tor Kvernvik, Täby (SE); Marin Orlic, Bromma (SE); Alessandro Previti, Stockholm (SE); Konstantinos Vandikas, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 698 days.

(21) Appl. No.: 18/248,551

(22) PCT Filed: Oct. 14, 2020

(86) PCT No.: PCT/IB2020/059645

§ 371 (c)(1),
(2) Date: Apr. 11, 2023

(87) PCT Pub. No.: WO2022/079472

PCT Pub. Date: Apr. 21, 2022

(65) Prior Publication Data

US 2023/0413168 A1 Dec. 21, 2023

(51) Int. Cl.

| | |
|---|---|
| ***H04W 48/18*** | (2009.01) |
| ***H04W 8/18*** | (2009.01) |
| ***H04W 8/22*** | (2009.01) |
| ***H04W 24/08*** | (2009.01) |

(52) U.S. Cl.
CPC ............. *H04W 48/18* (2013.01); *H04W 8/18* (2013.01); *H04W 8/22* (2013.01); *H04W 24/08* (2013.01)

(58) Field of Classification Search
CPC ......... H04W 48/18; H04W 8/18; H04W 8/22; H04W 24/08
See application file for complete search history.

(56) References Cited

U.S. PATENT DOCUMENTS

| | | | | |
|---|---|---|---|---|
| 6,243,754 | B1 | 6/2001 | Guerin et al. | |
| 8,553,596 | B1 | 10/2013 | Vivanco et al. | |
| 10,848,936 | B2 * | 11/2020 | Bhaskaran | H04W 4/40 |
| 10,880,748 | B1 * | 12/2020 | Gundavelli | H04W 12/03 |

(Continued)

FOREIGN PATENT DOCUMENTS

| | | | |
|---|---|---|---|
| EP | 3614644 | A2 | 2/2020 |
| WO | 2019005970 | A1 | 1/2019 |

OTHER PUBLICATIONS

International Search Report and Written Opinion for International Patent Application No. PCT/IB2020/059645, mailed Jun. 29, 2021, 14 pages.

(Continued)

*Primary Examiner* — Abdullahi Ahmed
(74) *Attorney, Agent, or Firm* — Weisberg I.P. Law, P.A.

(57) ABSTRACT

There is provided a method performed by an entity for managing connectivity of a device to a network. The method comprises selecting, from a plurality of connectivity service providers in the network, a connectivity service provider (CSP) to connect the device to the network. The selection is based on information about the device.

19 Claims, 4 Drawing Sheets

(56) References Cited

U.S. PATENT DOCUMENTS

| | | | | |
|---|---|---|---|---|
| 2007/0019670 | A1 | 1/2007 | Falardeau | |
| 2009/0005041 | A1 | 1/2009 | Steinberg et al. | |
| 2012/0089845 | A1 | 4/2012 | Raleigh | |
| 2012/0196644 | A1 | 8/2012 | Scherzer et al. | |
| 2014/0087730 | A1 | 3/2014 | Shitara | |
| 2014/0195458 | A1 | 7/2014 | Rizzi et al. | |
| 2015/0049618 | A1 | 2/2015 | Kritt et al. | |
| 2015/0351021 | A1 | 12/2015 | Zhang et al. | |
| 2017/0311243 | A1* | 10/2017 | Rinne | H04W 48/18 |
| 2018/0376325 | A1 | 12/2018 | Xu et al. | |
| 2018/0376411 | A1* | 12/2018 | Rinne | H04W 12/062 |
| 2019/0260639 | A1* | 8/2019 | Balakrishnan | H04L 41/0823 |
| 2020/0210885 | A1 | 7/2020 | Arora et al. | |
| 2021/0112401 | A1* | 4/2021 | Chadwick | H04W 8/205 |

OTHER PUBLICATIONS

Communication pursuant to Article 94(3) EPC dated Nov. 17, 2025 for Application No. 20797558.2, consisting of 6 pages.

* cited by examiner

Select a CSP to connect the device to the network, wherein the selection is based on information about the device

102

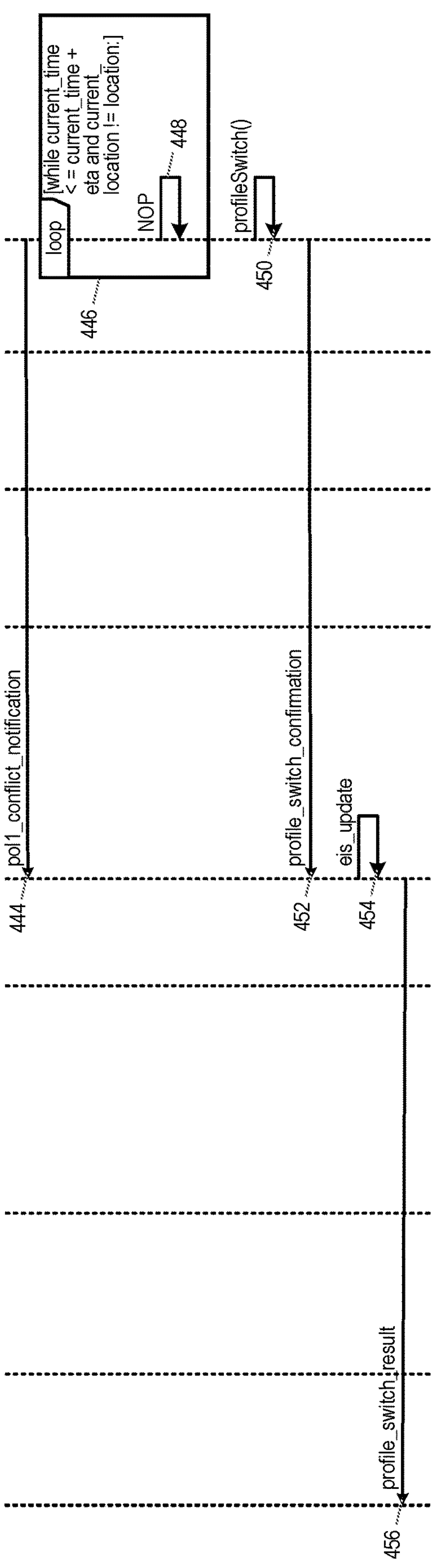
Figure 4 *(continued)*

MANAGING CONNECTIVITY OF A DEVICE TO A NETWORK

This application is a 35 U.S.C. § 371 national phase filing of International Application No. PCT/IB2020/059645, filed Oct. 14, 2020, the disclosure of which is incorporated herein by reference in its entirety.

TECHNICAL FIELD

The disclosure relates to a method for managing connectivity of a device to a network and an entity configured to operate in accordance with that method.

BACKGROUND

With recent advances in technology, the ease of connecting a device to a network is becoming increasingly important. However, a user of a device is usually limited to one connectivity service provider (CSP) for connecting the device to the network.

For example, some devices require a subscriber identity module (SIM) card to be manually inserted into a device to allow the device to connect to the network through a predefined CSP. In more recent years, embedded SIM (e-SIM) cards have become a popular alternative. An e-SIM card is a programmable SIM card. It allows for selection of a CSP and effectively turns enterprises into virtual network operators. Typically, the selection of a CSP takes place upon booting (or bootstrapping) the device comprising the e-SIM card. In particular, the booting of the device comprising the e-SIM card triggers the provisioning of the e-SIM card in a home subscriber server (HSS) database. As such, the process of procuring a contract with a CSP is automated, which improves the way in which connectivity of a device is managed.

However, even though e-SIM cards provide an improved approach over the more conventional SIM cards, both approaches still suffer from the fact that they are usually limited to one CSP for connecting the device to the network.

SUMMARY

It is thus an object of the disclosure to obviate or eliminate at least some of the above-described disadvantages associated with existing techniques.

Therefore, according to an aspect of the disclosure, a method for managing connectivity of a device to a network is provided. The method is performed by an entity. The method comprises selecting, from a plurality of connectivity service providers in the network, a connectivity service provider (CSP) to connect the device to the network. The selection is based on information about the device.

In this way, an advantageous technique for managing connectivity of a device is provided. The technique is improved over existing techniques since the selection of a CSP is based on information about the device, which means that the selection is more dynamic. In particular, the selection is personalised for the device, which means that the most appropriate CSP for that particular device can be selected. This can ensure that the device is provided with the best connectivity possible, e.g. in terms of coverage, available services, quality of service, etc. Moreover, as the selection is based on information about the device, the information is readily available. As such, deep inspection of data is not required. In this way, the technique is more efficient and consumes less computing resources for its implementation.

In some embodiments, selecting the CSP may comprise identifying a reference device from a plurality of reference devices, wherein the information about the device most closely matches corresponding information about the identified reference device, and selecting the CSP that is preferred by the identified reference device.

In some embodiments, the CSP that is preferred by the identified reference device may be identified from a rating assigned to each of the plurality of CSPs for the reference device.

In some embodiments, the rating assigned to each of the plurality of CSPs for the reference device may be based on information about the CSP and/or information about the reference device when the CSP connects the reference device to the network.

In some embodiments, the information about the reference device may comprise information indicative of a quality of service for the reference device.

In some embodiments, selecting the CSP may comprise, for each of the plurality of CSPs, using a machine learnt model to predict a rating for the CSP for the device by inputting into the machine learnt model the information about the device and/or information about the CSP, wherein an output of the machine learnt model is the predicted rating, and selecting the CSP based on the predicted rating for each of the plurality of CSPs for the device.

In some embodiments, the machine learnt model may be trained, to predict ratings for each of the plurality of CSPs, using ratings assigned to each of the plurality of CSPs for a plurality of reference devices.

In some embodiments, for each of the plurality of CSPs, the predicted rating may be the rating that is assigned to the CSP for an identified reference device of the plurality of reference devices, wherein the information about the device, that is input into the machine learnt model, most closely matches corresponding information about the identified reference device.

In some embodiments, the method may comprise training the machine learnt model to predict ratings for each of the plurality of CSPs.

In some embodiments, the information about the CSP may comprise information indicative of a volume of traffic served by the CSP, an interference management capability of the CSP, a communications technology supported by the CSP, one or more bearers that are dedicated to the CSP, and/or a packet data network gateway via which the CSP connects to the network.

In some embodiments, the information about the device may be acquired from at least one call data record (CDR) for the device and/or a profile for a user of the device. The use of at least one CDR can provide a non-intrusive approach as this information is already typically available as it is used for charging purposes.

In some embodiments, the at least one CDR for the device may be stored at one or more call charging nodes (CCNs).

In some embodiments, the method may comprise initiating transmission, towards an operator of the network, of an identifier that identifies the device and an identifier that identifies the selected CSP.

In some embodiments, the method may comprise, if a profile for the selected CSP is not stored at the device, initiating transmission of the profile for the selected CSP towards the device for storage.

In some embodiments, the device may already be connected to the network via a first CSP and the selected CSP may be a second CSP, wherein the first CSP and the selected second CSP may be different CSPs.

In some embodiments, the method may comprise initiating a switch, at the device, from a profile for the first CSP to a profile for the selected second CSP.

In some embodiments, the switch may be initiated at a predefined time, when the device is at a predefined location in the network, and/or when the device is idle.

In some embodiments, initiating the switch may comprise initiating disablement, at the device, of the profile for the first CSP and initiating enablement, at the device, of the profile for the selected second CSP.

In some embodiments, the information about the device may comprise information indicative of a type of the device, a functionality supported by the device, a usage of the device, and/or one or more demographic characteristics of a user of the device.

In some embodiments, the information about the usage of the device may comprise an amount of uplink and/or downlink data for the device per unit of time, one or more areas visited by the device, a packet loss for the device, and/or a Wi-Fi usage of the device.

In some embodiments, the one or more demographic characteristics of the user of the device may comprise an age of the user of the device and/or an occupation of the user of the device.

In some embodiments, an identity of the user of the device may be unidentifiable from the information about the device.

In some embodiments, the method may be triggered by the device or an operator of the network.

In some embodiments, the method may be performed subsequent to the device booting.

In some embodiments, the method may be repeated in respect of at least one other CSP.

In some embodiments, the device may comprise an embedded subscriber identity module (e-SIM) for allowing the device to connect to the network.

According to another aspect of the disclosure, there is provided an entity configured to operate in accordance with the method described earlier. The entity thus provides the advantages described earlier.

In some embodiments, the entity comprises processing circuitry configured to operate in accordance with the method described earlier.

In some embodiments, the entity comprises at least one memory for storing instructions which, when executed by the processing circuitry, cause the entity to operate in accordance with the method described earlier.

According to another aspect of the disclosure, there is provided a computer program comprising instructions which, when executed by processing circuitry, cause the processing circuitry to perform the method described earlier. The computer program thus provides the advantages described earlier.

According to another aspect of the disclosure, there is provided a computer program product, embodied on a non-transitory machine-readable medium, comprising instructions which are executable by processing circuitry to cause the processing circuitry to perform the method described earlier. The computer program product thus provides the advantages described earlier.

Therefore, an advantageous technique for managing connectivity of a device to a network is provided.

BRIEF DESCRIPTION OF THE DRAWINGS

For a better understanding of the techniques, and to show how they may be put into effect, reference will now be made, by way of example, to the accompanying drawings, in which.

DETAILED DESCRIPTION

Figures 1, 2:
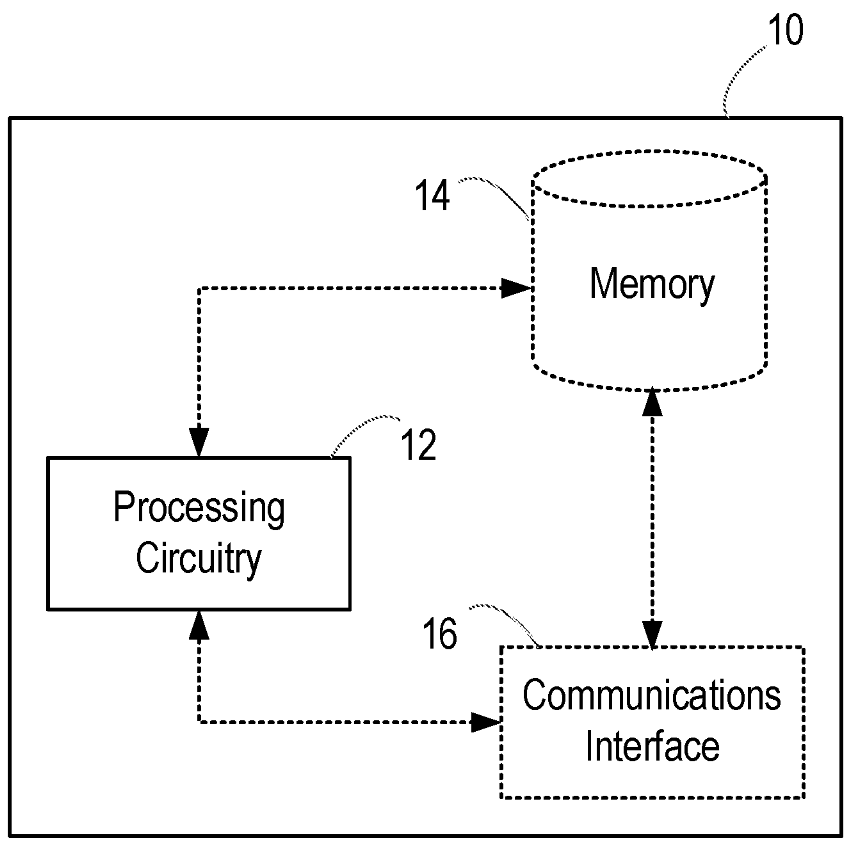
FIG. 1 is a block diagram illustrating an entity according to an embodiment.
FIG. 2 is a flowchart illustrating a method performed by an entity according to an embodiment.

As mentioned earlier, the use of an e-SIM card allows for the automation of the process of procuring a contract with a CSP, which improves the way in which connectivity of a device is managed. However, even though e-SIM cards provide an improved approach over the more conventional SIM cards, both approaches still suffer from the fact that they are essentially static approaches as they generally only allow for a one-time selection of a CSP. An e-SIM card contains a list of profiles that each describe different connectivity settings (such as public land mobile network (PLMN), default bearer, etc) and, by default, each e-SIM card comes with a fallback-profile, which is used for bootstrapping purposes. The profiles are typically pushed to the e-SIM card by a mobile network operator (MNO) as soon as the MNO is selected via the fallback-profile and thereafter directly by the MNO that has been selected. Although the profiles can be enabled or disabled at the e-SIM, they can only by enabled or disabled by the MNO. In most cases, the MNO is the same as the CSP and thus it is unlikely that an MNO will push the profile of a different CSP into an e-SIM card, which it manages. This is particularly the case since each MNO only trusts its own certificates and not those from other MNOs.

Thus, existing approaches are static and, as such, they are not designed to take into consideration a dynamic landscape of CSPs. A dynamic landscape of CSPs can have a footprint that extends over multiple countries and may even have a global footprint. The services, and optionally also the quality of service (QoS) of those services, provided by the CSPs in such a dynamic landscape can differ significantly from one country to another or even between different types of applications (e.g. voice applications, video applications, audio applications, massive internet of things (IoT) applications, etc). U.S. Pat. No. 6,243,754 discloses an approach whereby a router selects an appropriate service provider, for communication of a specific set of application data, using a variety of selection criteria that include cost, QoS, and pre-established business contracts. However, this approach is limited as it is application specific and it also requires deep inspection of data that is produced by each user.

The static nature of existing techniques for managing the connectivity of a device limit the device in terms of coverage, available services, quality of service, etc. Moreover, the complexity of some of the existing techniques that require deep inspection of data makes them inefficient and means that valuable computing resources are consumed for their implementation.

Thus, as mentioned earlier, an advantageous technique for managing connectivity of a device to a network is described herein, which is aimed at obviating or eliminating at least some of the above-described disadvantages associated with existing techniques. The device referred to herein can be any device that can be connected to a network. For example, the device referred to herein may be a user equipment (UE), such as a phone, a tablet, a laptop, or any other user equipment or an Internet of Things (IoT) device, such as a vehicle or any other IoT device that may take advantage of the techniques described herein.

The network referred to herein can be a fourth generation (4G) network, a fifth generation (5G) network, or any other generation network. The network referred to herein can be a telecommunications network, such as a cellular or mobile network. The network referred to herein may, for example, be a radio access network (RAN), or any other type of telecommunications network. The network referred to herein can comprise one or more network nodes, such as one or more base stations. The one or more network nodes can be for use in connecting the device to the network. In a RAN embodiment, the one or more network nodes may comprise one or more evolved Node Bs (eNodeBs) and/or any other RAN nodes. In some embodiments, the network referred to herein can be a virtualized network (e.g. comprising virtual network nodes), an at least partially virtualized network (e.g. comprising at least some virtual network nodes and at least some hardware network nodes), or a hardware network (e.g. comprising hardware network nodes).

FIG. 1 illustrates an entity 10 in accordance with an embodiment. The entity 10 is for managing connectivity of a device to a network. The entity 10 may, for example, be a physical machine (e.g. a server) or a virtual machine (VM). Herein, the entity 10 may also be referred to as a CSP recommendation entity. In some embodiments, the entity can be an entity of the network. For example, the entity 10 may be a network element, such as a network node, according to some embodiments. In some embodiments, the device itself or an e-SIM of the device may comprise the entity 10. In other embodiments, the entity 10 may be separate to the device.

As illustrated in FIG. 1, the entity 10 comprises processing circuitry (or logic) 12. The processing circuitry 12 controls the operation of the entity 10 and can implement the method described herein in respect of the entity 10. The processing circuitry 12 can be configured or programmed to control the entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the entity 10. In some embodiments, the processing circuitry 12 can be configured to run software to perform the method described herein in respect of the entity 10. The software may be containerised according to some embodiments. Thus, in some embodiments, the processing circuitry 12 may be configured to run a container to perform the method described herein in respect of the entity 10.

Briefly, the processing circuitry 12 of the entity 10 is configured to select, from a plurality of connectivity service providers in the network, a connectivity service provider (CSP), to connect the device to the network. The selection is based on information about the device. As the selection of a CSP is based on information about the device, the selection is more dynamic. In particular, the selection is personalised for the device, which means that the most appropriate CSP for that particular device can be selected. This can ensure that the device is provided with the best connectivity possible (e.g. in terms of coverage, available services, quality of service, etc). Moreover, the fact that the selection is based on information about the device means that the information is readily available. As such, deep inspection of data is not required. In this way, the technique is more efficient and consumes less computing resources for its implementation than the existing techniques mentioned earlier.

As illustrated in FIG. 1, in some embodiments, the entity 10 may optionally comprise a memory 14. The memory 14 of the entity 10 can comprise a volatile memory or a non-volatile memory. In some embodiments, the memory 14 of the entity 10 may comprise a non-transitory media. Examples of the memory 14 of the entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the entity 10 can be connected to the memory 14 of the entity 10. In some embodiments, the memory 14 of the entity 10 may be for storing program code or instructions which, when executed by the processing circuitry 12 of the entity 10, cause the entity 10 to operate in the manner described herein in respect of the entity 10. For example, in some embodiments, the memory 14 of the entity 10 may be configured to store program code or instructions that can be executed by the processing circuitry 12 of the entity 10 to cause the entity 10 to operate in accordance with the method described herein in respect of the entity 10. Alternatively or in addition, the memory 14 of the entity 10 can be configured to store any information, data, messages, requests, responses, indications, notifications, signals, or similar, that are described herein. The processing circuitry 12 of the entity 10 may be configured to control the memory 14 of the entity 10 to store information, data, messages, requests, responses, indications, notifications, signals, or similar, that are described herein.

In some embodiments, as illustrated in FIG. 1, the entity 10 may optionally comprise a communications interface 16. The communications interface 16 of the entity 10 can be connected to the processing circuitry 12 of the entity 10 and/or the memory 14 of entity 10. The communications interface 16 of the entity 10 may be operable to allow the processing circuitry 12 of the entity 10 to communicate with the memory 14 of the entity 10 and/or vice versa. Similarly, the communications interface 16 of the entity 10 may be operable to allow the processing circuitry 12 of the entity 10 to communicate with the device referred to herein, the network referred to herein, any other entities referred to herein, and/or any nodes referred to herein. The communications interface 16 of the entity 10 can be configured to transmit and/or receive information, data, messages, requests, responses, indications, notifications, signals, or similar, that are described herein. In some embodiments, the processing circuitry 12 of the entity 10 may be configured to control the communications interface 16 of the entity 10 to transmit and/or receive information, data, messages, requests, responses, indications, notifications, signals, or similar, that are described herein.

Although the entity 10 is illustrated in FIG. 1 as comprising a single memory 14, it will be appreciated that the entity 10 may comprise at least one memory (i.e. a single memory or a plurality of memories) 14 that operate in the manner described herein. Similarly, although the entity 10 is illustrated in FIG. 1 as comprising a single communications interface 16, it will be appreciated that the entity 10 may comprise at least one communications interface (i.e. a single communications interface or a plurality of communications interface) 16 that operate in the manner described herein. It will also be appreciated that FIG. 1 only shows the components required to illustrate an embodiment of the entity 10 and, in practical implementations, the entity 10 may comprise additional or alternative components to those shown.

FIG. 2 is a flowchart illustrating a method performed by an entity 10 in accordance with an embodiment. The method is for managing connectivity of a device to a network. The entity 10 described earlier with reference to FIG. 1 can be configured to operate in accordance with the method of FIG. 2. The method can be performed by or under the control of the processing circuitry 12 of the entity 10 according to some embodiments.

With reference to FIG. 2, as illustrated at block 102, a connectivity service provider (CSP) is selected, from a plurality of CSPs, to connect the device to the network. More specifically, the processing circuitry 12 of the entity 10 can select the CSP according to some embodiments. In some embodiments, the device may already be connected to the network via a first CSP and the selected CSP may be a second CSP. In these embodiments, the first CSP and the selected second CSP may be different CSPs. Herein, a CSP is a service provider that can provide connectivity between a device and a network. More specifically, a CSP is a service provider that can connect the device to the network.

The selection of a CSP to connect the device to the network is based on information about the device. In some embodiments, the information about the device referred to herein may comprise information indicative of a type of the device (e.g. phone, tablet, vehicle, etc), a functionality supported by the device, a usage of the device (e.g. a usage pattern of the device, which may be profiled), one or more demographic characteristics of a user of the device, and/or any other information about the device. In some embodiments, the information about the usage of the device referred to herein may comprise an amount of uplink and/or downlink data for the device per unit of time (e.g. per month), one or more areas (e.g. most frequent areas) visited by the device, a packet loss for the device, a Wi-Fi usage of the device, and/or any other information about the usage of the device. In some embodiments, the one or more demographic characteristics of a user of the device referred to herein may comprise an age of the user of the device, an occupation of the user of the device, and/or any other demographic characteristics of the user of the device. In some embodiments, an identity of the user of the device may be unidentifiable from the information about the device. That is, the information about the device may not contain specific data about the user. The information about the device can thus be anonymous when it is acquired or the entity 10 may anonymise the information about the device.

In some embodiments, the information about the device may be acquired from at least one call data record (CDR) for the device and/or a profile for a user of the device. In some embodiments, the at least one CDR for the device may be stored at one or more call charging nodes (CCNs). Alternatively or in addition, in some embodiments, the information about the device may be acquired from at least one memory 14 of the entity and/or for at least one memory external to the entity 10. In some embodiments, the method may comprise acquiring (e.g. receiving) the information about the device. More specifically, the processing circuitry 12 of the entity 10 may be configured to acquire (e.g. via the communications interface 16 of the entity 10) the information about the device according to some embodiments.

In some embodiments, selecting the CSP to connect the device to the network may comprise identifying a reference device from a plurality of reference devices and selecting the CSP that is preferred by the identified reference device. In some of these embodiments, the information about the device most closely matches corresponding information about the identified reference device. Thus, the reference device may be identified by comparing information about the device to information about the plurality of reference devices to find a reference device with information that most closely matches the information about the device. Herein, information about the device may most closely match corresponding information about the identified reference device by being most similar to, or differing the least from, the corresponding information about the identified reference device. A person skilled in the art will be aware of various techniques that can be used to identify information that most closely matches other information. In some of these techniques, a similarity measure (such as cosine similarity) may be used to quantify the similarity between the information about the device and the corresponding information about each reference device in order to identify which information is most similar to (or most closely matches) the information about the device. Generally, it may be that the information that is most similar to (or most closely matches) the information about the device is that which has the largest similarity measure or that which has a similarity measure that is greater than a predefined threshold.

Thus, in some embodiments, the CSP that is selected may be the CSP that is preferred by the identified reference device. In some embodiments, the CSP that is preferred by the identified reference device may be identified from a rating assigned to each of the plurality of CSPs for the reference device. The rating assigned to each of the plurality of CSPs for the reference device can effectively be used to rank the CSPs in order of preference for the reference device. The rating may be a number (e.g. on a scale of 0 to 5, with 0 being the lowest rating and 5 being the highest rating) or a percentage (e.g. with 0% being the lowest rating and 100% being the highest rating).

In some embodiments, the rating assigned to each of the plurality of CSPs for the reference device may be based on information about the CSP and/or information about the reference device when the CSP connects the reference device to the network. In some embodiments, the information about the CSP referred to herein may comprise information indicative of a volume of (e.g. uplink and/or downlink) traffic served by the CSP, an interference management capability of the CSP, a communications technology (e.g. radio access technology, RAT) supported by the CSP, one or more bearers (e.g. one or more machine type communication, MTC, bearers) that are dedicated to the CSP, a packet data network gateway via which the CSP connects to the network, an identifier of a public land mobile network (PLMN) to which the CSP belongs, a type of node served by the CSP, an identifier (e.g. an international mobile subscriber identity, IMSI) of one or more devices served by the CSP, and/or any other information about the CSP. In some embodiments, the information about the reference device may comprise information indicative of a quality of service for the reference device.

In some embodiments, the rating assigned to each of the plurality of CSPs for the reference device may be acquired (e.g. directly) from a user of the reference device. For example, a user may provide a rating (as feedback) based on their experience of connecting to the network via different CSPs, such as a speed of data transmission using the connection, a quality of the connection, a stability of the connection, etc. A user may provide a rating via a user interface, such as a user interface of their reference device, and the rating may be transmitted to the entity 10. Alternatively or in addition, the rating assigned to each of the plurality of CSPs for the reference device may be influenced by one or more metrics acquired from the reference device itself when the CSP is connecting the reference device to the network, such as a measure of a speed of data transmission achieved using the connection, a measure of a quality of the connection, a measure of a stability of the connection, etc. A reference device may comprise one or more sensors to obtain such measures (or measurements).

Alternatively or in addition, the ratings may be assigned at a network node, such as a call charging node (CCN). In some of these embodiments, reference devices may be clustered based on the information about them. For example, reference devices that use at least some of the same types of applications (e.g. per location) may be clustered together. The types of applications may, for example, comprise voice, video, audio, etc. A rating may then be assigned to each CSP for each cluster of reference devices. In some embodiments, an CSP that has the highest volume of traffic (e.g. for a specific type of application and/or per location) may be assigned a higher rating than other CSPs.

In some embodiments, selecting the CSP to connect the device to the network may comprise using a (e.g. biased) matrix factorisation to predict ratings for each of the plurality of CSPs. In these embodiments, the matrix factorisation may take as input a matrix comprising the ratings assigned to each of the plurality of CSPs for the plurality of reference devices. In some embodiments, the matrix factorisation may be biased. For example, the matrix factorisation may be biased towards one or more CSPs with which the device has previously interacted. A person skilled in the art will be aware of various matrix factorisation processes (or algorithms) that can be used for this purpose. In these embodiments, the CSP can be selected based on the predicted rating for each of the plurality of CSPs for the device.

Alternatively or in addition, in some embodiments, selecting the CSP to connect the device to the network may comprise, for each of the plurality of CSPs, using a machine learnt model to predict a rating for the CSP for the device. In some embodiments, the machine learnt model may be used to predict a rating for the CSP for the device by inputting into the machine learnt model the information about the device and/or information about the CSP. In these embodiments, an output of the machine learnt model can then be the predicted rating, and the CSP can be selected based on the predicted rating for each of the plurality of CSPs for the device.

In some embodiments, the machine learnt model may be trained, to predict ratings for each of the plurality of CSPs, using ratings assigned to each of the plurality of CSPs for a plurality of reference devices. In some embodiments, for each of the plurality of CSPs, the predicted rating may be the rating that is assigned to the CSP for an identified reference device of the plurality of reference devices. In these embodiments, the information about the device, that is input into the machine learnt model (after it has been trained), most closely matches corresponding information about the identified reference device. In this way, an accurate predicted rating for an CSP for the device can be output, since it is likely that the device will have the same, or a similar, rating as a reference device that has the most in common with it.

In some embodiments, the method may comprise the actual training of the machine learnt model to predict ratings for each of the plurality of CSPs. The ratings assigned to each of the plurality of CSPs for the plurality of reference devices provide the (ground truth) outputs for the machine learnt model to be used, together with the corresponding inputs, in training the machine learnt model. As mentioned earlier, the corresponding inputs can be the information about the device and/or the information about the CSP. The training data used to train the machine learnt model can thus comprise the ratings assigned to each of the plurality of CSPs for the plurality of reference devices, and the information about the device and/or the information about the CSP. The machine learnt model can learn a mapping between the inputs and the (ground truth) outputs. In this way, when an input is subsequently provided to the trained machine learnt model, the trained machine learnt model is able to predict a corresponding output.

In some embodiments, the processing circuitry 12 of the entity 10 may be configured to train the machine learnt model. However, in other embodiments, the machine learnt model may already be trained, e.g. by another entity. The machine learnt model may be trained using any suitable machine learning process (or algorithm), such as a neural network, a random forest, deep learning, or any other machine learning process.

In an example, there may be a learnable vector $u_i$ for each reference device. The learnable vector $u_i$ for each reference device can represent the information (e.g. properties) about the reference device, such as that mentioned earlier. Similarly, there may be a learnable vector $csp_j$ for each CSP. The learnable vector $csp_j$ for each CSP can represent information (e.g. properties) about the CSP, such as that mentioned earlier. Thus, in this example, the learnable vector $u_i$ for each reference device and the learnable vector $csp_j$ for each CSP may be an input for the machine learnt model. In some embodiments, each reference device may have a bias $\beta_i$ and/or each CSP may have a bias $\gamma_i$. In these embodiments, the biases may also be an input for the machine learnt model. In some embodiments, the biases may bias the selection towards one or more particular CSPs and/or one or more CSPs preferred by one or more particular reference devices. For example, the selection may be biased towards one or more CSPs with which the device has previously interacted.

An example way in which a rating $r_{i,j}$ for a CSP for a device may be predicted by the machine learnt model is, as follows:

$$r_{i,j}=u_i^{T}*csp_j+\beta_i+\gamma_i.$$

In some embodiments, one or both of the biases $\beta$ and $\gamma$ can be set to zero. This can avoid a case where the same CSP is selected because it has been used by the device in the past.

In some embodiments, as mentioned earlier, the machine learnt model can be trained to predict the rating for a CSP for a device from ratings assigned to a plurality of CSPs for a plurality of reference devices. The training data used to train the machine learnt model can thus comprise ratings that are already known according to some embodiments. In some of these embodiments, the machine learnt model can be trained from explicit feedback using a mean squared error (MSE) equation, as follows:

$$\min_{u,csp}=\text{sum}(\hat{r}_{i,j}-r_{i,j})^2.$$

This MSE equation aims to minimise the difference between the predicted ratings $\hat{r}_{i,j}$ for each CSP j for each reference device i and the corresponding actual ratings $r_{i,j}$ for each CSP j for each reference device i. An actual rating $r_{i,j}$ is the rating that is already known and which is thus available during the training process. The sum in the MSE equation can be over the plurality of (e.g. all) reference devices and the CSPs that have connected those reference devices to the network in the past.

On the other hand, ratings that are already known may not be available. Thus, in other embodiments, the machine learnt model may be trained from implicit feedback, rather than explicit feedback, such as ratings. This can involve training the machine learnt model using historical interactions between reference devices and CSPs. For example, past interactions between reference devices and CSPs may be sampled, noise may be added to the past interactions, and the machine learnt model may be trained to recognise the difference between the (fake) past interactions that have noise added to them and the (real) past interactions that do not have noise added to them.

Although not illustrated in FIG. 2, in some embodiments, the method may comprise initiating transmission, towards an operator of the network (or an entity of the network operator), an identifier that identifies the device and an identifier that identifies the selected CSP. More specifically, the processing circuitry 12 of the entity 10 can be configured to initiate transmission of these identifiers (e.g. via the communications interface 16 of the entity 10) towards an operator of the network according to some embodiments. Herein, the term "initiate" can mean, for example, cause or establish. Thus, the processing circuitry 12 of the entity 10 can be configured to itself transmit these identities (e.g. via a communications interface 16 of the entity 10) or can be configured to cause another entity to transmit these identities. In some embodiments, the identifier that identifies the device may be an identifier that identifies an integrated circuit card (ICCID) of the device and/or an embedded subscriber identity module (e-SIM) of the device. Herein, an e-SIM may also be referred to as an embedded universal integrated circuit card (e-UICC).

Although not illustrated in FIG. 2, in some embodiments, the method may comprise, if a profile for the selected CSP is not stored at the device (e.g. at an ICCID and/or e-SIM of the device), initiating transmission of the profile for the selected CSP towards the device for storage. More specifically, the processing circuitry 12 of the entity 10 can be configured to initiate transmission of (e.g. itself transmit or cause another entity to transmit, such as via the communications interface 16 of the entity 10) the profile for the selected CSP towards the device for storage according to some embodiments. Thus, in the case where the profile for the selected CSP is unavailable at the device, it can be pushed to the device proactively. It may be assumed that an operator of the network (or network operator) has established a trust relationship with the plurality of CSPs and, as such, it already has in its disposal all related profiles for each CSP. In this way, the entity 10 (or, more specifically, the processing circuitry 12 of the entity 10) can communicate with the network operator (e.g. via the communications interface 16 of the entity 10) to initiate transmission of the profile for the selected CSP towards the device for storage. The network operator referred to herein can be a physical network operator or a virtual network operator. For example, the network operator may be a physical mobile network (MNO) or a virtual mobile network operator (VMNO).

Although also not illustrated in FIG. 2, in some embodiments where the device is already connected to the network via a first CSP and the selected CSP is a second CSP, the method may comprise initiating a switch, at the device (e.g. at an ICCID and/or e-SIM of the device), from a profile for the first CSP to a profile for the selected second CSP. More specifically, the processing circuitry 12 of the entity 10 can be configured to initiate the switch according to some embodiments. In some embodiments, the switch may be initiated at a predefined time, when the device is at a predefined location in the network, and/or when the device is idle. In some embodiments, initiating the switch may comprise initiating disablement, at the device, of the profile for the first CSP and initiating enablement, at the device, of the profile for the selected second CSP.

In some embodiments, the method described herein may be triggered by the device or an operator of the network. In some embodiments, the method described herein may be performed subsequent to the device booting. For example, a CSP may already be predefined when the device is booted or a CSP may be selected when the device is booted, and the selection of a CSP described herein may be a selection that occurs subsequent to this. In some embodiments, the method described herein may be repeated in respect of at least one other CSP. Thus, for example, a third CSP may be selected in the manner described herein and the entity 10 (or, more specifically, the processing circuitry 12 of the entity 10) may initiate a switch at the device from the profile of the second CSP to a profile for the selected third CSP in the manner described herein. This can be repeated for any number of CSPs. In this way, multiple switches can occur.

In some embodiments, the device referred to herein may comprise an integrated circuit card (ICCID) and/or an embedded subscriber identity module (e-SIM) card for allowing the device to connect to the network. As mentioned earlier, an e-SIM may also be referred to as an embedded universal integrated circuit card (e-UICC).

Figure 3:
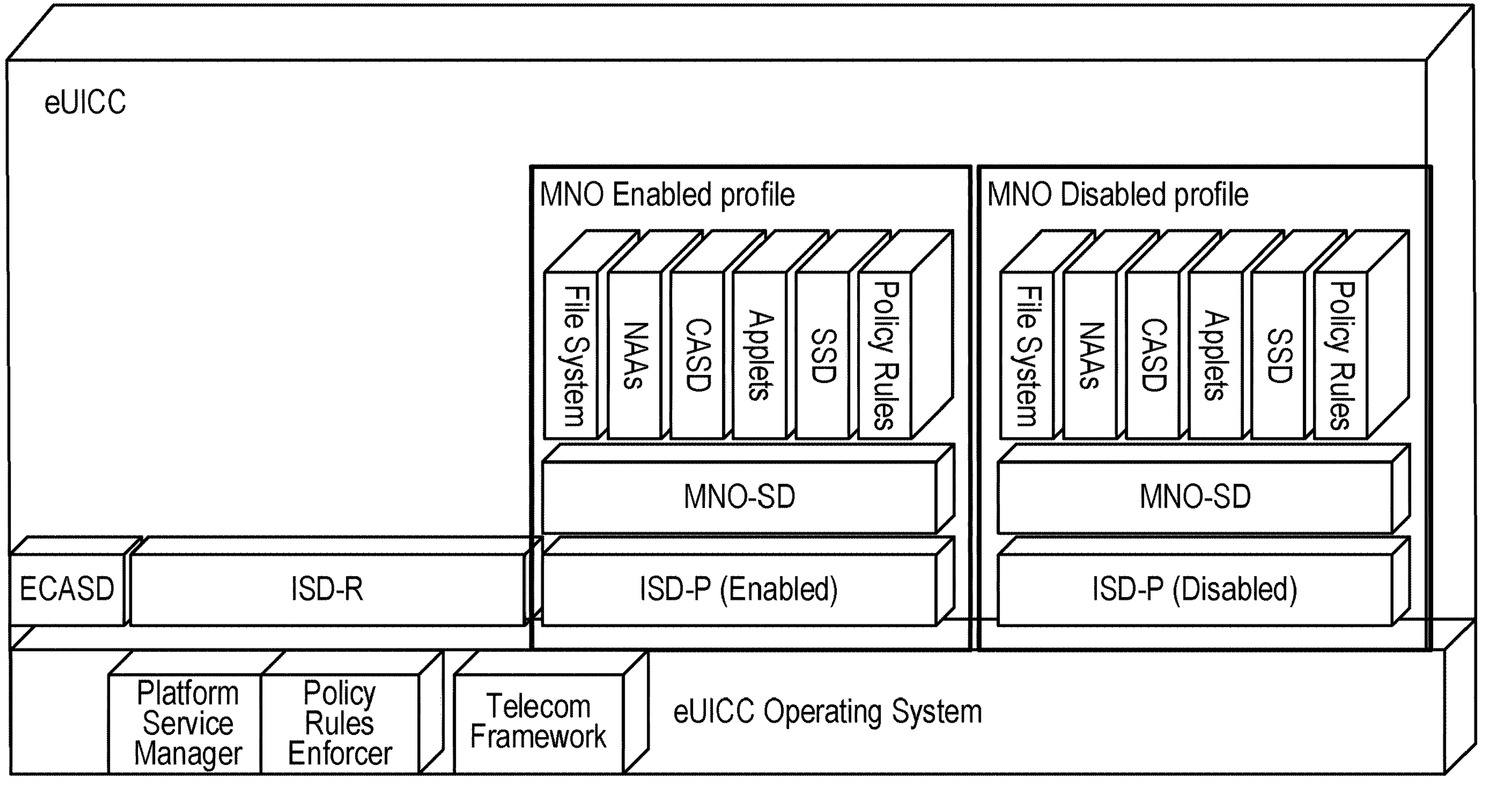
FIG. 3 is a block diagram illustrating an embedded subscriber identity module.

FIG. 3 illustrates an example e-SIM card (or e-UICC). As illustrated in FIG. 3, the e-SIM card comprises an operating system. The operating system comprises a platform service manager, a policy rules enforcer, a telecommunications framework. The e-SIM card also comprises an e-SIM controlling authority security domain (ECASD) and an issuer security domain root (ISD-R). The e-SIM card also comprises a network operator (e.g. an MNO) enabled profile and a network operator (e.g. an MNO) disabled profile. Each of the profiles comprise a file system, network access applications (NAAs), a controlling authority security domain (CASD), applets, a supplementary security domain (SSD), and policy rules. Each of the profiles also comprise a network operator security domain (e.g. a mobile network operator security domain, MNO-SD). The network operator enabled profile comprises an enabled issuer security domain profile (ISD-P), whereas the network operator disabled profile comprises a disabled ISD-P.

In some embodiments, the entities that may be involved in the switching (e.g. enabling and/or disabling) from a profile for one CSP to a profile for another selected CSP in the manner described herein may comprise a subscription manager secure routing (SM-SR) entity, a subscription manager data preparation (SM-DP) entity, and/or a network operator (e.g. MNO) entity. For example, an SM-SR entity may be responsible for loading, enabling, disabling and/or deleting profiles at the e-SIM, an SM-DP entity may be responsible for producing a personalised version of a profile that is originally created by a network operator entity, and a network operator entity may be responsible for providing the network connectivity and/or selecting the SM-DP. Thus, in some embodiments, the entity 10 (or, more specifically, the processing circuitry 12 of the entity 10) can communicate with such an SM-SR entity, SM-DP entity, and/or network operator entity to initiate the switching of the profiles.

There is also provided a system. The system can comprise at least one entity 10 as described herein. The system can also comprise at least one device and/or at least one network as referred to herein.

Figure 4:
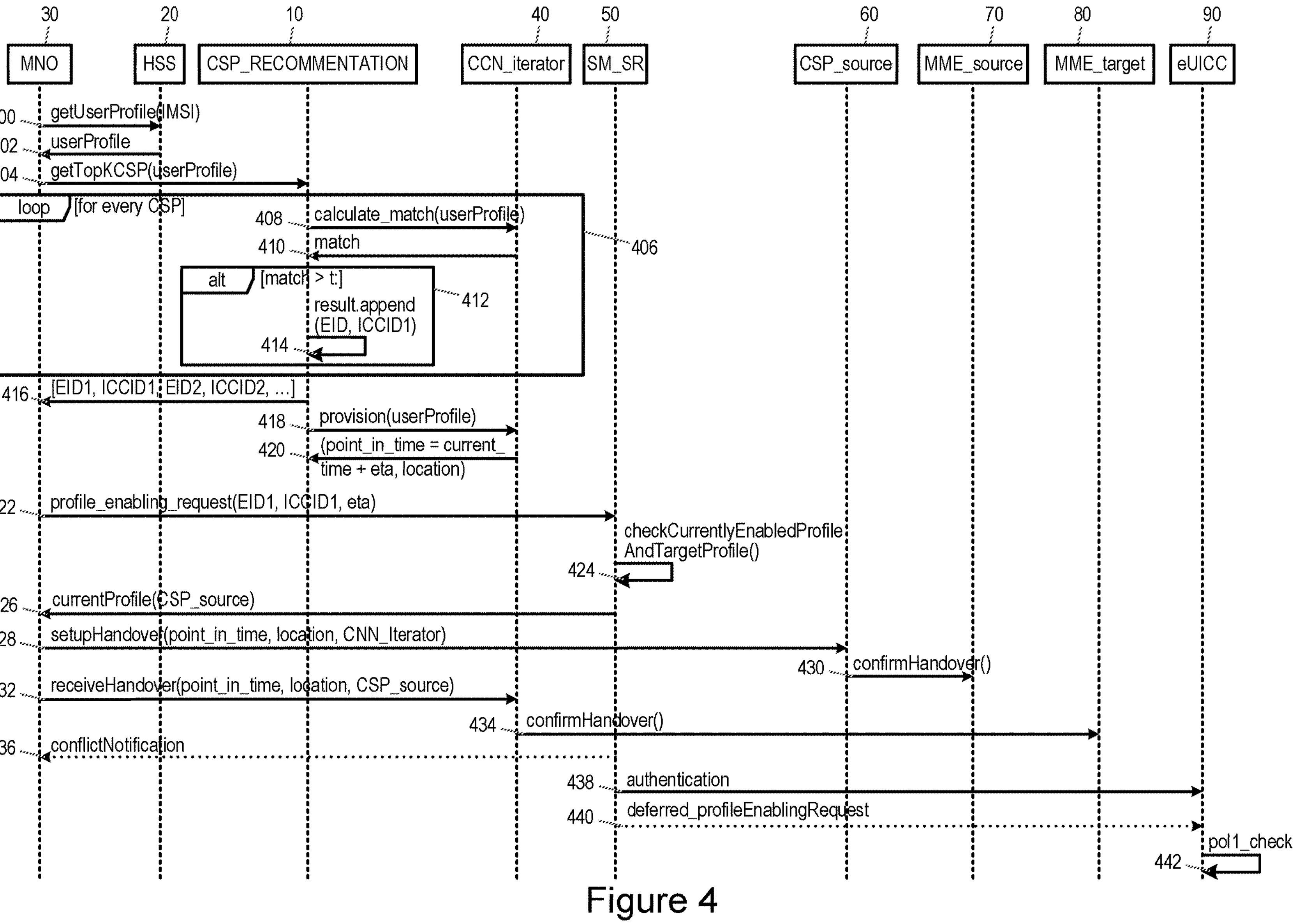
FIG. 4 is a signalling diagram illustrating an exchange of signals in a system according to an embodiment.

FIG. 4 is a signalling diagram illustrating an exchange of signals in a system according to an embodiment. The system illustrated in FIG. 4 comprises the entity 10. The entity 10 can be as described earlier with reference to FIGS. 1 and 2. The entity 10 is for managing connectivity of a device to a network.

The system illustrated in FIG. 4 also comprises the device 90 (or, for example, an e-UICC of the device according to some embodiments). The system illustrated in FIG. 4 also comprises a network operator (e.g. MNO) entity 30, a home subscriber sever (HSS) 20, a core network node (CNN) iterator 40, a subscription manager secure routing (SM-SR) node 50, a CSP (or a source node of the CSP) 60, a mobile management entity (MME) source node 70, and an MME target node 80. However, it will be understood that the system may comprise any other nodes and/or entities, and/or any combination thereof according to other embodiments.

As illustrated by arrows 400 and 402 of FIG. 4, information about the device 90 can be acquired, such as any of the information described earlier. In the embodiment illustrated in FIG. 4, a profile of the user of the device 90 comprises the information about the device 90 and thus the profile of the user of the device 90 is acquired at arrows 400 and 402 of FIG. 4. The profile can be acquired by the network operator entity 30, e.g. from the HSS 20. For example, as illustrated by arrow 400 of FIG. 4, the network operator entity 30 may transmit a request towards the HSS 20 for the profile of the user of the device 90. The network operator entity 30 thus triggers the selection of a CSP in the embodiment illustrated in FIG. 4. However, it will be understood that the device 90 itself may trigger the selection in other embodiments.

As illustrated by arrow 402 of FIG. 4, in response to the request, the HSS 20 may transmit the profile of the user of the device 90 towards the network operator entity 30. Thus, the network operator entity 30 receives the profile of the user of the device 90. As illustrated by arrow 404 of FIG. 4, the network operator entity 30 may transmit a request to the entity 10 for an CSP to connect the device 90 to the network. This request may comprise the profile of the user of the device 90.

Steps 408-412 in block 406 of FIG. 4 relate to the selection of a CSP. The process by which a CSP is selected is handled by the entity 10. In the embodiment illustrated in FIG. 4, the entity 10 is a trusted entity. Thus, the entity 10 is allowed to access the CNN iterator 40. The entity 10 may access different CSPs via the CNN iterator 40. As illustrated by block 406 of FIG. 4, steps 408-420 of FIG. 4 can be performed for a plurality of CSPs, e.g. for every CSP.

As illustrated by arrow 408 of FIG. 4, the entity 10 transmits the information about the device 90 (e.g. the user profile comprising the information about the device 90) towards a plurality of CSPs (e.g. every CSP) via the CNN iterator 40. The information about the device 90 is transmitted in order to produce a CSP match for the device 90. As illustrated by arrow 410 of FIG. 4, the entity 10 receives information identifying a plurality of reference devices in respect of which the information about the device 90 may match corresponding information about the identified reference device. This information is received from the plurality of CSPs via the CNN iterator 40.

As illustrated by block 412 of FIG. 4, the entity 10 identifies a reference device from the plurality of reference devices and selects the CSP that is preferred by the identified reference device to connect the device 90 to the network. The identified reference device is the reference device in respect of which the information about the device 90 most closely matches the corresponding information about that reference device. For example, the identified reference device may be the reference device for which the match (e.g. a similarity metric) is greater than a predefined threshold t. The CSP that is preferred by the identified reference device may be identified from a rating assigned to each of the plurality of CSPs for the reference device. In some embodiments, there may be multiple CSPs suitable for selection. For example, there may be more than one CSP preferred by the identified reference device or there may be at least two reference devices identified that each prefer different CSPs. In these embodiments, the entity 10 may select the CSP that it first identifies to be a preferred CSP. In this way, a selection can be made quicker and the method is more efficient.

As illustrated by arrow 414 of FIG. 4, in some embodiments, the entity 10 may append an identifier that identifies the device 90 to an identifier that identifies the selected CSP. As illustrated by arrow 416 of FIG. 4, the entity 10 transmits the identifier that identifies the device 90 and the identifier that identifies the selected CSP towards the network operator entity 30. In some embodiments, the identifier that identifies the device 90 may be an identifier of an embedded universal integrated circuit card (EID) of the device 90 and/or an identifier of an integrated circuit card (ICCID) of the device 90. In some embodiments, the method may be performed for a plurality of devices, in which case an identifier that identifies each of these devices may be transmitted.

As illustrated by arrow 418 of FIG. 4, the entity 10 transmits a request towards the CNN iterator 40 to provision the user profile at the selected CSP. As illustrated by arrow 420 of FIG. 4, the entity 10 may receive from the CNN iterator 40 a predefined time (or a predefined point in time) and/or a predefined location in the network. The predefined time may be equal to the current time plus an estimated time of arrival at the predefined location. The predefined time and/or the predefined location in the network can be referred to as a rendezvous point in time and/or space.

As illustrated by arrow 422 of FIG. 4, the network operator entity 30 transmits a request towards the SM-SR node 50 to enable the profile for the selected CSP at the device 90. The request can comprise an identifier that identifies the device, such as an EID and/or ICCID for the device 90. The request can also comprise the estimated time of arrival. As illustrated by arrow 424 of FIG. 4, the SM-SR node 50 checks which CSP profile is currently enabled at the device 90. For example, the device may already be connected to the network via a first CSP 60 and the selected CSP may be a second CSP. The first CSP 60 and the selected second CSP are different CSPs. In this case, the CSP profile currently enabled at the device 90 is the profile for the first CSP 60 and it is the profile for the selected second CSP that needs to be enabled at the device 90. The profile for the first CSP 60 may also be referred to as the currently enabled profile and the profile for the selected second CSP may also be referred to as the target profile. The SM-SR node 50 can also check whether the profile for the selected second CSP node is available at the device 90. As illustrated by arrow 426 of FIG. 4, the SM-SR node 50 transmits a response towards the network operator entity 30, which comprises information indicative that the profile for the first CSP 60 is currently enabled at the device 90.

As illustrated by arrow 428 of FIG. 4, the network operator entity 30 transmits a request towards the first CSP 60 to set up a handover from the first CSP 60 to the selected second CSP. The request can comprise the predefined time mentioned earlier, the predefined location mentioned earlier, and/or an identifier that identifies the CNN iterator As illustrated by arrow 430 of FIG. 4, the first CSP 60 transmits a message confirming the handover to the MME source node 70. As illustrated by arrow 432 of FIG. 4, the network operator entity 30 transmits a request towards the CNN iterator 40 to receive the handover. The request can comprise the predefined time mentioned earlier, the predefined location mentioned earlier, and/or an identifier that identifies the first CSP 60. As illustrated by arrow 434 of FIG. 4, the CNN iterator 40 transmits a message confirming the handover to the MME target node 80.

As illustrated by arrow 436 of FIG. 4, if the handover is not possible (i.e. there is a conflict), the SM-SR node 50 may transmit a notification towards the network operator entity 30 to notify the network operator entity 30 of the conflict. As illustrated by arrow 438 of FIG. 4, the SM-SR node 50 transmits a request towards the device 90 for authentication. That is, the SM-SR node 50 requests to be authenticated with the device 90 (or, more specifically, the e-SIM of the device 90). Once the SM-SR node 50 is authenticated, the SM-SR node 50 can push a new profile to the device 90 (e.g. to the e-SIM of the device 90). As illustrated by arrow 440 of FIG. 4, the SM-SR node 50 may transmit a (e.g. deferred) request towards the device 90 to enable the profile for the selected second CSP node at the device 90. As illustrated by arrow 442 of FIG. 4, the device 90 may check whether it is possible to enable the profile (i.e. whether there is a conflict). As illustrated by arrow 444 of FIG. 4, if there is a conflict, the device 90 may transmit a notification towards the SM-SR node 50 to notify the SM-SR node 50 of the conflict.

As illustrated by block 446 of FIG. 4, the device 90 may check whether the predefined time is reached and/or the device 90 is at the predefined location. As illustrated by arrow 448 of FIG. 4, the device 90 may determine that the predefined time has not been reached and/or the device 90 is not at the predefined location, which may be referred to as a NO operation (NOP). In this case, the check may be repeated until it is determined that the predefined time has been reached and/or the device 90 is at the predefined location. As illustrated by arrow 450 of FIG. 4, once the predefined time is reached and/or the device 90 is at the predefined location (i.e. the device 90 is at the rendezvous point in time and/or space), the device 90 switches from the profile for the first CSP to the profile for the selected second CSP. For example, the device may disable the profile for the first CSP and enable the profile for the selected second CSP. If the rendezvous point is missed, the activation may take place when the device 90 is idle. The profile for the selected second CSP may already be available at the device 90 for this switch to occur. However, if the selected second CSP is not already available at the device 90, the profile for the selected second CSP can be pushed to the device 90.

As illustrated by arrow 452 of FIG. 4, the device 90 transmits a message towards the SM-SR node 50 to confirm to the SM-SR node 50 that the profile switch is completed. As illustrated by arrow 454 of FIG. 4, the SM-SR node 50 updates information about the current state of the device 90 or, more specifically, information about the current state of the e-SIM of the device 90. For example, an e-SIM information set (EIS) for the device may be updated. The updated information may be indicative of which profile is enabled at the device 90 and/or which profile is disabled at the device 90 as a result of the switch. As illustrated by arrow 456 of FIG. 4, the SM-SR node 50 transmits the result of the profile switch towards the network operator entity 30.

There is also provided a computer program comprising instructions which, when executed by processing circuitry (such as the processing circuitry 12 of the entity 10 described earlier), cause the processing circuitry to perform at least part of the method described herein. There is provided a computer program product, embodied on a non-transitory machine-readable medium, comprising instructions which are executable by processing circuitry (such as the processing circuitry 12 of the entity 10 described earlier) to cause the processing circuitry to perform at least part of the method described herein. There is provided a computer program product comprising a carrier containing instructions for causing processing circuitry (such as the processing circuitry 12 of the entity 10 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the entity 10 functionality described herein can be performed by hardware. Thus, in some embodiments, the entity 10 described herein can be a hardware entity. However, it will also be understood that optionally at least part or all of the entity 10 functionality described herein can be virtualized. For example, the functions performed by the entity 10 described herein can be implemented in software running on generic hardware that is configured to orchestrate the entity functionality. Thus, in some embodiments, the entity 10 described herein can be a virtual entity. In some embodiments, at least part or all of the entity 10 functionality described herein may be performed in a network enabled cloud. Thus, the method described herein can be realised as a cloud implementation according to some embodiments. The entity 10 functionality described herein may all be at the same location or at least some of the entity functionality may be distributed, e.g. the entity 10 functionality described herein may be performed by one or more different entities.

It will be understood that at least some or all of the method steps described herein can be automated in some embodiments. That is, in some embodiments, at least some or all of the method steps described herein can be performed automatically. Thus, an automatic (dynamic) CSP selection can be made according to some embodiments. The method described herein can be a computer-implemented method.

Therefore, in the manner described herein, there is advantageously provided a technique for managing connectivity of a device to a network. The technique can enable a dynamic selection (or recommendation) of a CSP and can also enable switching from one CSP to another CSP.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by an entity for managing connectivity of a device to a network, the method comprising:

selecting, from a plurality of connectivity service providers in the network, a connectivity service provider (CSP) to connect the device to the network, the selection based on information about the device, selecting the CSP comprising:

identifying a reference device from a plurality of reference devices, the information about the device most closely matching corresponding information about the identified reference device; and selecting the CSP that is preferred by the identified reference device.

2. The method as claimed in claim 1, wherein:

the CSP that is preferred by the identified reference device is identified from a rating assigned to each of the plurality of CSPs for the reference device.

3. The method as claimed in claim 2, wherein:

the rating assigned to each of the plurality of CSPs for the reference device is based on information about the CSP and/or information about the reference device when the CSP connects the reference device to the network.

4. The method as claimed in claim 3, wherein:

the information about the reference device comprises information indicative of:

a quality of service for the reference device.

5. The method as claimed in claim 1, wherein:

selecting the CSP comprises:

for each of the plurality of CSPs, using a machine learnt model to predict a rating for the CSP for the device by inputting into the machine learnt model the information about the device and/or information about the CSP, wherein an output of the machine learnt model is the predicted rating; and selecting the CSP based on the predicted rating for each of the plurality of CSPs for the device.

6. The method as claimed in claim 5, wherein:

the machine learnt model is trained, to predict ratings for each of the plurality of CSPs, using ratings assigned to each of the plurality of CSPs for a plurality of reference devices.

7. The method as claimed in claim 6, wherein:

for each of the plurality of CSPs, the predicted rating is the rating that is assigned to the CSP for an identified reference device of the plurality of reference devices, wherein the information about the device, that is input into the machine learnt model, most closely matches corresponding information about the identified reference device.

8. The method as claimed in claim 5, the method comprising:

training the machine learnt model to predict ratings for each of the plurality of CSPs.

9. The method as claimed in claim 3, wherein:

the information about the CSP comprises information indicative of:

a volume of traffic served by the CSP;

an interference management capability of the CSP;

a communications technology supported by the CSP;

one or more bearers that are dedicated to the CSP;

a packet data network gateway via which the CSP connects to the network;

an identifier of a public land mobile network to which the CSP belongs;

a type of node served by the CSP; and/or an identifier of one or more devices served by the CSP.

10. The method as claimed in claim 1, wherein:

the information about the device is acquired from at least one call data record, CDR, for the device and/or a profile for a user of the device.

11. The method as claimed in claim 10, wherein:

the at least one CDR for the device is stored at one or more call charging nodes, CCNs.

12. The method as claimed in claim 1, the method comprising:

initiating transmission, towards an operator of the network, an identifier that identifies the device and an identifier that identifies the selected CSP.

13. The method as claimed in claim 1, the method comprising:

if a profile for the selected CSP is not stored at the device, initiating transmission of the profile for the selected CSP towards the device for storage.

14. The method as claimed in claim 1, wherein:

the device is already connected to the network via a first CSP and the selected CSP is a second CSP, wherein the first CSP and the selected second CSP are different CSPs.

15. The method as claimed in claim 14, the method comprising:

initiating a switch, at the device, from a profile for the first CSP to a profile for the selected second CSP.

16. The method as claimed in claim 15, wherein:

the switch is initiated:

at a predefined time;

when the device is at a predefined location in the network; and/or when the device is idle.

17. The method as claimed in claim 15, wherein:

initiating the switch comprises:

initiating disablement, at the device, of the profile for the first CSP; and initiating enablement, at the device, of the profile for the selected second CSP.

18. The method as claimed in claim 1, wherein:

the information about the device comprises information indicative of:

a type of the device;

a functionality supported by the device;

a usage of the device; and/or one or more demographic characteristics of a user of the device.

19. The method as claimed in claim 18, wherein:

the information about the usage of the device comprises:

an amount of uplink and/or downlink data for the device per unit of time;

one or more areas visited by the device;

a packet loss for the device; and/or a Wi-Fi usage of the device.

* * * * *